(12) United States Patent
Dault

(10) Patent No.: US 6,398,006 B1
(45) Date of Patent: Jun. 4, 2002

(54) ROTARY TURRET WITH PEDESTALS AND A METHOD OF CONTROLLING ROTATION THEREOF

(75) Inventor: Ronald B. Dault, Kitchener (CA)

(73) Assignee: Joseph E. Seagram & Sons Ltd., Kitchener (CA)

(*) Notice: Subject to any disclaimer, the term of this patent is extended or adjusted under 35 U.S.C. 154(b) by 58 days.

(21) Appl. No.: 09/650,765

(22) Filed: Aug. 29, 2000

(51) Int. Cl.⁷ .................. B65G 29/00; B65G 47/244; B65G 47/84
(52) U.S. Cl. .................. 198/377.01; 198/377.1; 198/378; 198/411
(58) Field of Search .................. 198/377.01, 377.02, 198/377.1, 378, 379, 394, 411; 156/567, DIG. 26

(56) References Cited

U.S. PATENT DOCUMENTS 3,934,714 A * 1/1976 Matsumoto .................. 198/379
4,511,025 A * 4/1985 Nakayama .................. 198/377
5,326,422 A * 7/1994 Kronseder .................. 156/567
5,478,422 A * 12/1995 Bright et al. .................. 156/567
6,113,333 A * 9/2000 Rutledge et al. .................. 413/9

* cited by examiner

Primary Examiner—Christopher P. Ellis
Assistant Examiner—Mark A. Deuble
(74) Attorney, Agent, or Firm—Daryl W. Schnurr

(57) ABSTRACT

A rotary turret has a plurality of rotatable pedestals thereon, each pedestal being controlled by a separate motor. The location of each motor for each pedestal is fixed so that the motors do not change location as the turret rotatesl. There is a separate ring gear for each pedestal, the ring gear being concentrically mounted relative to one another. Each motor is indirectly connected to a different ring gear. As the turret rotates the pedestals rotate independently of the turret and independently of each other. The motors for each pedestal can be wired in a conventional manner.

9 Claims, 5 Drawing Sheets

ROTARY TURRET WITH PEDESTALS AND A METHOD OF CONTROLLING ROTATION THEREOF

BACKGROUND OF THE INVENTION

1. Field of the Invention

This invention relates to a rotary turret for use in a rotary packaging machine where the turret has a plurality of pedestals. The pedestals are connected to individual power sources that cause the pedestals to rotate independently of one another and independently of the turret. The individual power sources have a base that remains in a fixed position and the second power sources do not move from that fixed position as the turret rotates.

2. Description of the Prior Art

In previous rotary packaging machines having rotary turrets with rotatable pedestals thereon, each pedestal has an electric motor connected thereto. Each electric motor rotates the pedestal to which it is connected. As the turret rotates, the electric motors for each of the pedestal move with the turret. Obviously, as the turret continues to rotate, the wires that provide power to the electric motors would become twisted without a special and complex wiring, arrangement that allows the motors to receive power as the motors themselves rotate round and round with the turret, These packaging machines are often used to place labels on bottles or other containers. Each bottle is clamped on one of the pedestals. Since the bottle must be oriented correctly to receive the labels, the pedestals rotate the bottle to the correct position as the turret also rotates. After the labels have been properly applied, the bottle is automatically removed from the pedestal. The turret continues to rotate and receives a new unlabeled bottle and the process is repeated.

It is also known to rotate the pedestal using cams. When cams are used each pedestal rotates through a predetermined number of degrees as the turret rotates. The number of degrees for each pedestal cannot be varied without changing the cam after the packaging machine has been assembled.

SUMMARY OF THE INVENTION

It is an object of the present invention to provide a new arrangement of drive motors for rotatable pedestals on a rotary turret of a packaging machine whereby the motors have a base that is fixed and does not move as the turret rotates.

A rotary turret is used with a rotary packaging machine, the turret having a plurality of pedestals located thereon. The turret is connected to a first power source, the first power source causing the turret to rotate. The pedestals are connected indirectly to second power sources to cause the pedestals to rotate. The pedestals are capable of rotating independently of the turret. The second power sources have a base that is mounted in a fixed position so that the base does not move with the turret as the turret rotates.

A method of controlling a plurality of pedestals on a rotary turret has a first power source for the turret. The pedestals are indirectly connected to second power sources. The second power sources do not rotate with the turret. The method comprises concentrically mounting ring gears, the ring gears being rotatable relative to one another, connecting an individual second power source to a corresponding ring gear and connecting each ring gear to cause one pedestal to rotate.

DESCRIPTION OF A PREFERRED EMBODIMENT

Figure 1:
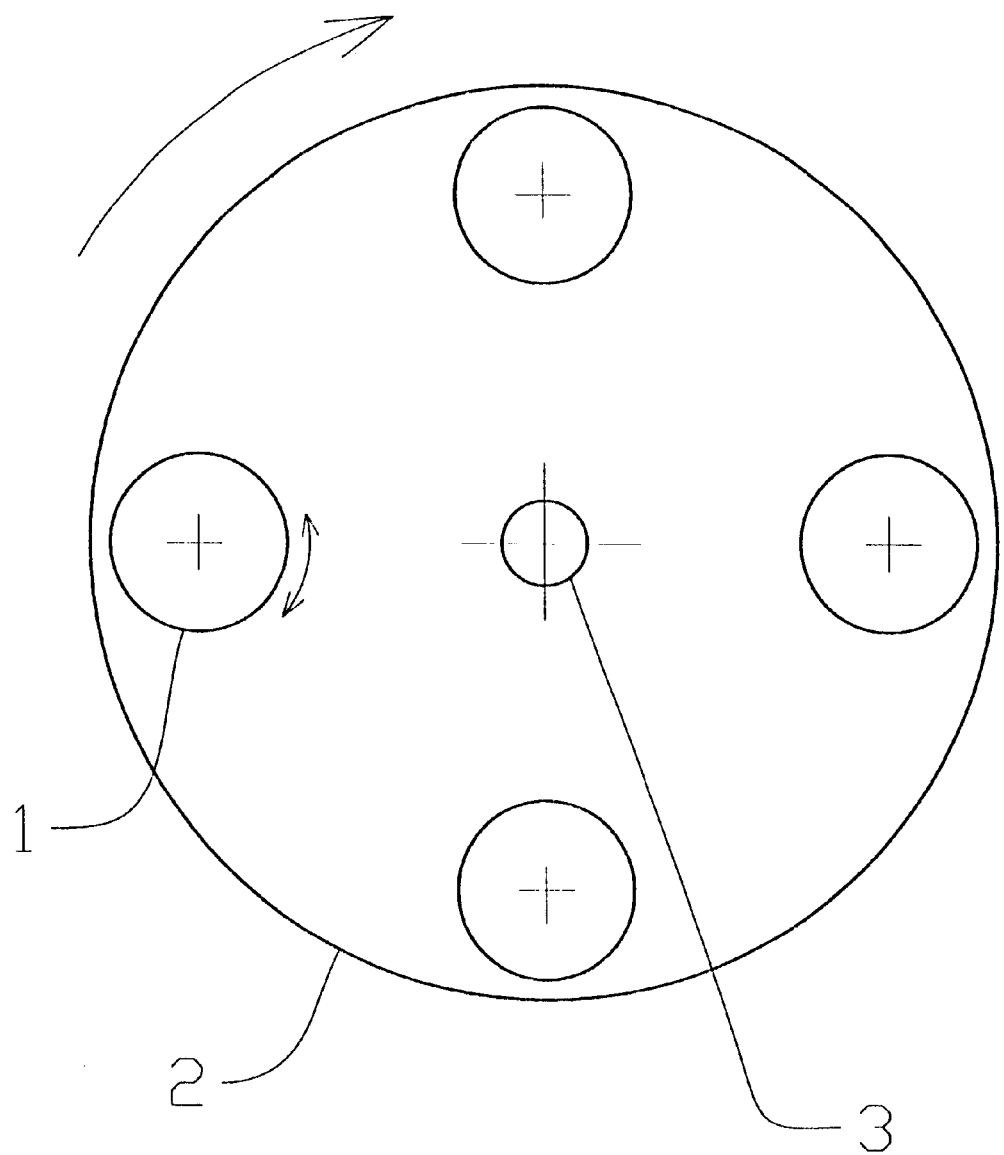
FIG. 1 is a top view of a turret and pedestals.

In FIG. 1, there is shown a lower turret 2 having four pedestals 4 mounted thereon. The lower turret 2 is mounted on a shaft 6. It can be seen that there is an arrow along the periphery of the lower turret indicating that the lower turret rotates in a clockwise direction. There is another double headed arrow adjacent to the periphery of one of the pedestals 4 indicating that the pedestals can rotate in either direction.

Figure 2:
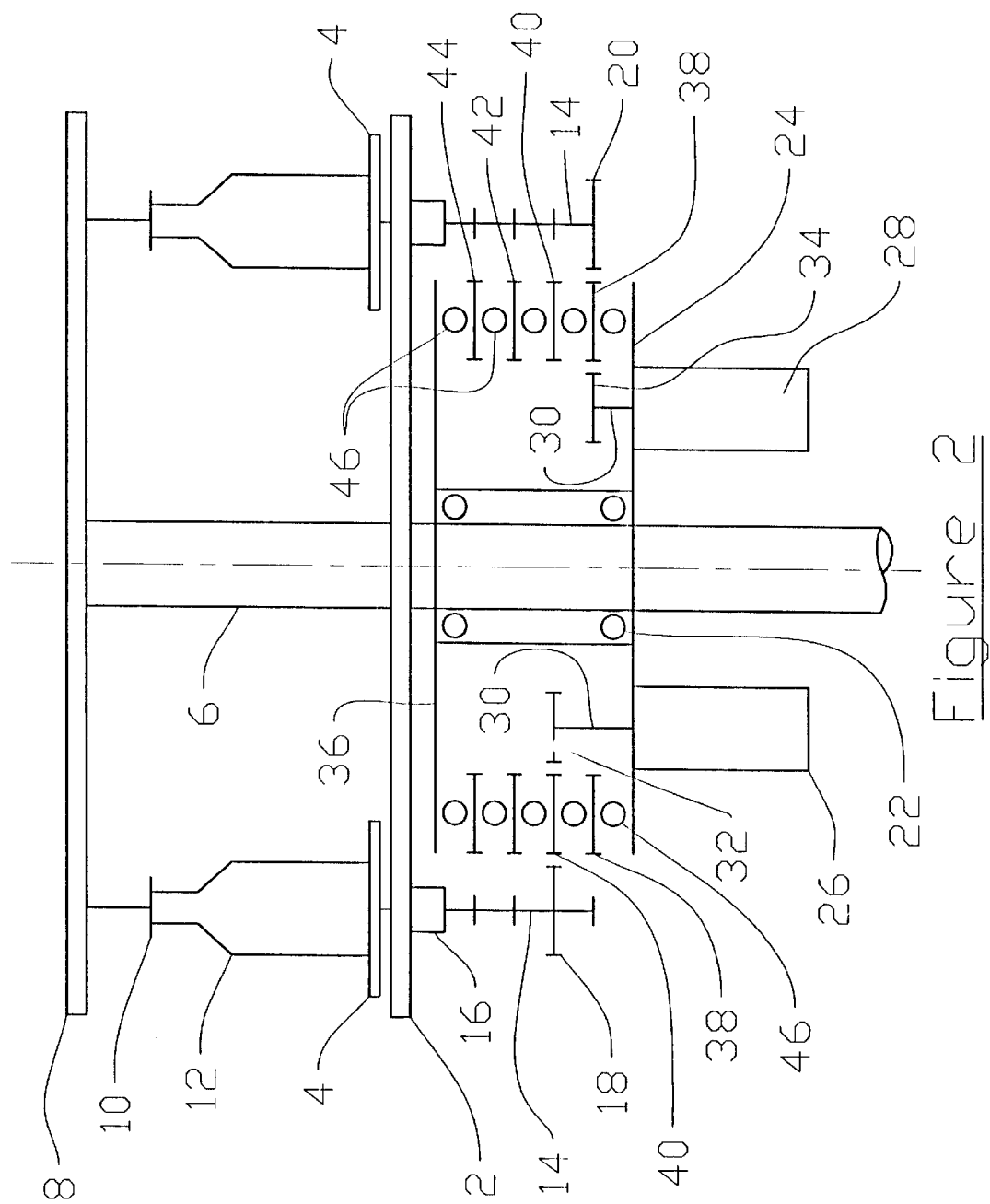
FIG. 2 is a schematic side view of a drive mechanism for the turret and pedestals of FIG. 1.

In FIG. 2, it can be seen that an upper part of the shaft 6 supports an upper turret 8. The upper turret 8 has bottle clamps 10 thereon to hold bottles 12 (or other containers) that are located on the pedestals 4 in position so that the bottles do not fall off the pedestals as the pedestals 4 and lower turret 2 rotate. The upper turret 8 and the lower turret 2 rotate in unison. A shaft 14 extends downward from each pedestal through the lower turret 2 and through a bearing housing 16. The shaft 14, shown on the left hand side of FIG. 2 has a gear 18 fixedly mounted thereon. Similarly, the other pedestal 4 shown on the right hand side of FIG. 2 has a shaft 14 with a gear 20 fixedly mounted thereon.

The main turret shaft 6 is supported by bearing 22. Immediately beneath the bearing 22, there is a lower plate 24 that is affixed to the bearing 22. As the shaft 6 rotates the lower turret 2 and the upper turret 8 also rotate, but the lower plate 24 and the bearing 22 remain fixed. There are two electric motors 26, 28 mounted on the lower plate 24. The lower plate 24 provides a base for the motors 26, 28 and does not rotate with the lower turret 2 The lower plate 24 is in a fixed position and does not rotate. The electric motor 26 has a shaft 30 extending therefrom with a gear 32 fixedly mounted on the shaft 30. Similarly the electric motor 28 has a shaft 30 with a gear 34 fixedly mounted thereto.

At an end of the bearing 22 opposite to the lower plate 24, there is mounted an upper plate 36. Between the lower plate 24 and the upper plate 36, there are located four ring gears 38, 40, 42, 44. The ring gears, 38, 40, 42, 44 are rotatably supported by a. plurality of bearings 46. The ring gears 38, 40, 42, 44 are concentrically mounted relative to one another. It can be seen that the ring gear 38, which is the lowest ring gear, is engagedly connected to the gear 20 of the pedestal 4 on the right hand side of the lower turret 2 and also to the gear 34 of the motor 28. Thus, as the shaft 30 on the motor 28 rotates, the gear 34 also rotates. As the gear 34 rotates, the ring gear 38 rotates, which, in turn, causes the gear 20 to rotate. When the gear 20 rotates, the pedestal 4 on the right hand side of FIG. 2 rotates. The pedestal 4 continues to rotate entirely independently of rotation of the lower turret 2, as long as the gear 34 rotates.

Similarly, as the shaft 30 on the motor 26 rotates, the gear 32 mounted on the shaft 30 also rotates. This causes the ring gear 40 to rotate which in turn causes the gear 18 on the shaft 14 of the pedestal 4 on the left hand side of the turret 2 in FIG. 2 to rotate. Since FIG. 2 is a side view, there are only two pedestals 4 and two corresponding motors 26, 28 shown. There would actually be four motors as there are four pedestals There is one electric motor for each pedestal. The third and fourth motors would be engagedly connected to ring gears 42 and 44 respectively.

There is another electric motor (not shown in FIG. 2) that drives the shaft 6 and is conventional. The motor that drives the shaft 6 is a first power means. The motors that drive the pedestals 4 are second power means.

Figure 3:
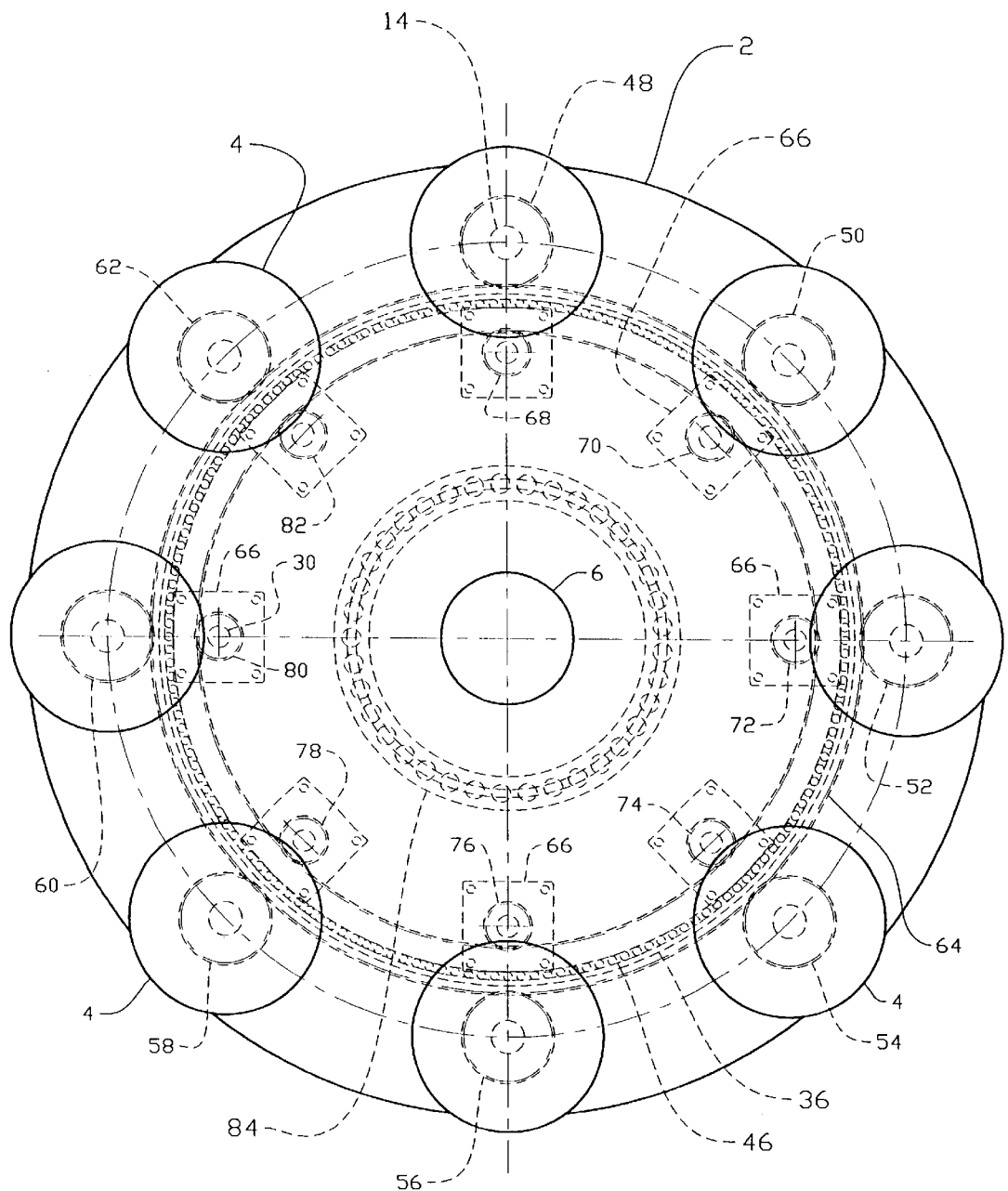
FIG. 3 is a top view of a turret with 8 pedestals thereon.

In FIG. 3, there is shown the lower turret 2 having eight pedestals 4 mounted thereon. Each pedestal has a shaft 14 which is shown by dotted lines and the eight pedestals 4 have gears 48, 50, 52, 54, 56, 58, 60, 62, which intermesh with the ring gears that are generally designated as 64 in FIG. 3. The ring gears are supported by bearings 46. Each pedestal 4 has a corresponding electric motor 66 with a shaft 30 containing one gear. The eight gears (one on each of the eight shafts 30) are designated as numbers 68, 70, 72, 74, 76, 78, 80, 82 in FIG. 3. The lower turret 2 has a shaft 6 with a bearing 84 that allows the lower turret to rotate as the shaft 6 rotates. The ring gears 64 are supported by the fixed upper plate 36.

Figure 4:
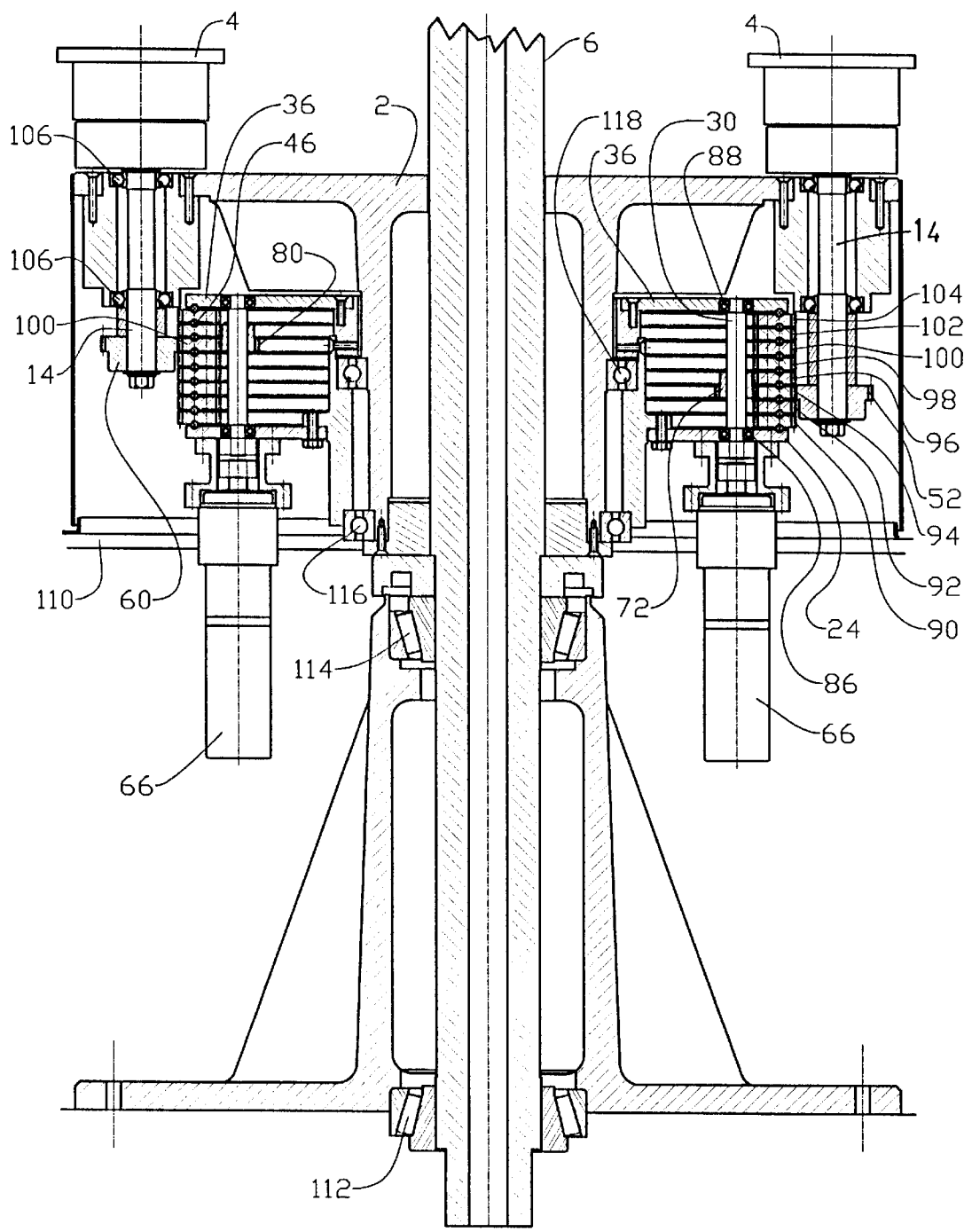
FIG. 4 is a partial sectional side view of the drive mechanism for the turret and pedestals of FIG. 3; and, FIG. 5 is a partial sectional side view of part of the drive mechanism of FIG. 4.
Figure 5:
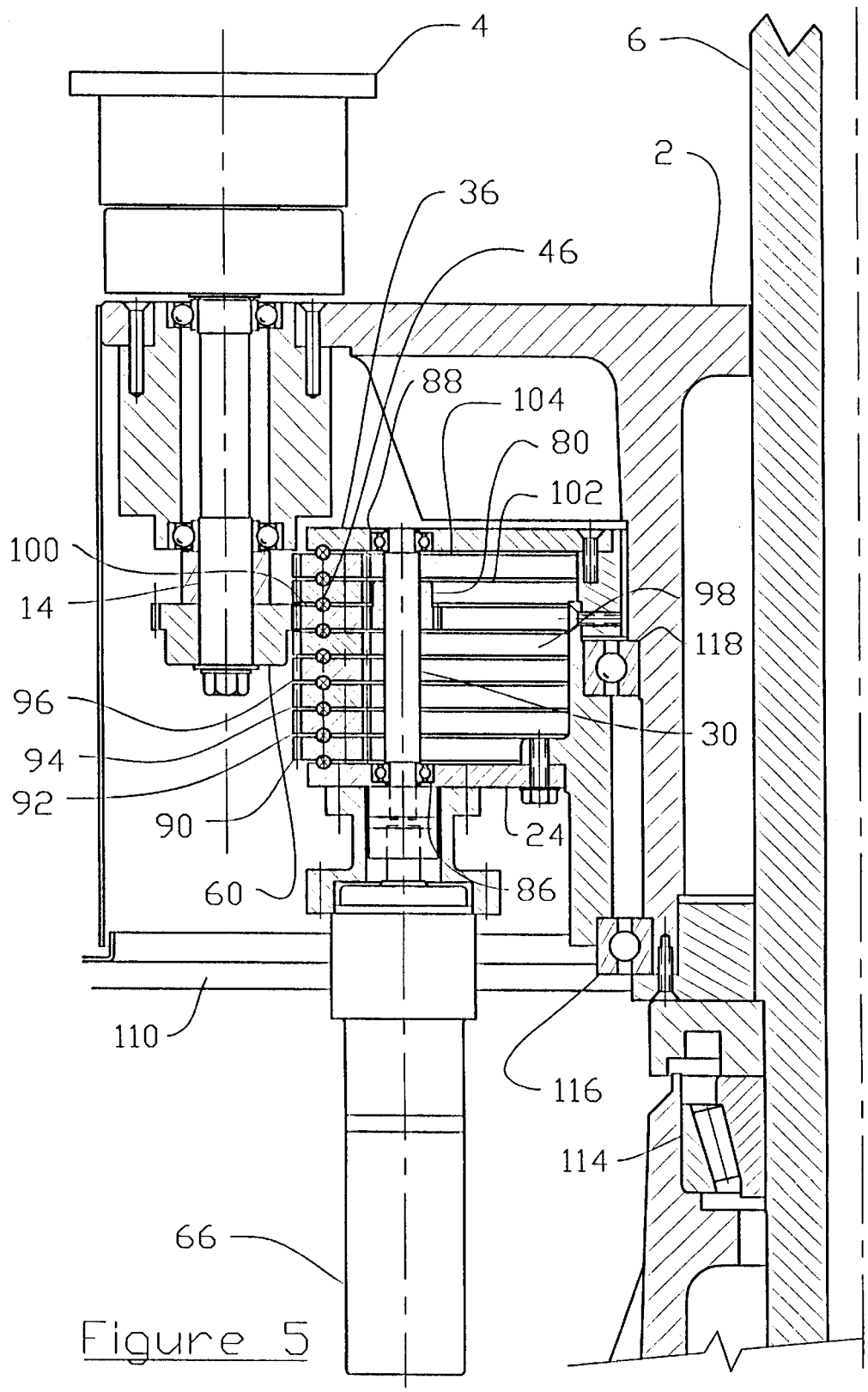

In FIGS. 4 and 5, there is shown a partial sectional side view of the drive mechanism for the lower turret 2 and pedestals 4. FIG. 5 is an enlarged view of the mechanism shown on the left hand side of FIG. 4 and when FIG. 4 is described, FIG. 5 will also be described. The same reference numerals are used in FIGS. 4 and 5 as those used in FIG. 3 unless otherwise stated. In FIG. 4, there are two electric motors 66 of the eight motors shown by dotted lines in FIG. 3. Each motor 66 has a shaft 30 and the motor on the right hand side of FIG. 4 has a gear 72 affixed to the shaft 30 while the motor 66 on the left hand side of FIG. 4 has a gear 80 affixed to the shaft 30. The shaft 30 of each motor extends through the lower plate 24 and the upper plate 36 having bearings 86, 88 respectively. The lower plate 24 and upper plate 36 also support the ring gears 90, 92, 94, 96, 98, 100, 102, 104, which can be seen separately in FIGS. 4 and 5 and are not designated by the general designation 64 used in FIG. 3. With the electric motor 66 shown on the right hand side of FIG. 4, the gear 72 intermeshes with an interior side of the ring gear 94, which has an exterior side that intermeshes with the gear 52 on the shaft 14 of the pedestal 4. Similarly, the motor 66 shown on the left hand side of FIG. 4 has a gear 80 that intermeshes with an interior side of the ring gear 100 which in turn has an outer edge that intermeshes with the gear 60 on the shaft 14 of the pedestal 4. As can be readily understood, the vertical location of the gear that affixed to the shaft 30 of the motor and the vertical location of the gear that is affixed to the shaft 14 of the pedestal determines which of the ring gears is activated and therefore which pedestal is rotated by a particular motor. While only two of the eight motors are shown it can be readily understood how the other six motors are connected and how the other six pedestals are rotated. Also can be seen that the ring gear engaged by a particular motor or pedestal can be changed by moving the appropriate gear on the shaft of the motor or shaft of the pedestal upward or downward. It can also be seen from FIG. 4 that the shaft 14 on the right hand side is longer than the shaft 14 on the left hand side as the gear 52 is further from the pedestal that it rotates than the gear 60 is from the pedestal that it rotates. It can also be seen that the shaft 14 of the pedestals 4 are rotatably mounted in bearings 106. Further, the ring gears are made rotatable relative to the lower plate 24 and the upper plate 36 by bearings 46. The motors 66 are mounted in a base plate 110 that does not rotate with the lower turret 2. There is another electric motor (not shown) that rotates the shaft 6 and therefore the lower turret 2. The electric motor that rotates the shaft 6 is not shown in the drawings because it is conventional. The motor that drives the shaft 6 is a first power means It can be seen that the shaft 6 is further supported in bearings 112, 114. Bearings 116, 118, allow the turret to rotate while the base plate 110 remains fixed Bearings 116, 118 maintain the concentric relationship of ring gears and the lower plate and upper plate relative to the base plate.

Preferably, the electric motors 66 for the pedestals are reversible. Then, the direction and degree of rotation each pedestal (there being a separate motor for each pedestal) can be precisely and independently controlled. The electric motor for the turret 2 could also be reversible. Since the location of the motors for each pedestal (i.e. the second power means) does not change as the turrets rotate and the location of the motor for the shaft 6 does not change as the turrets rotate, all of the motors can be wired in a conventional manner.

While the rotary turret of the present invention can be used for various purposes in a rotary packaging machine, one specific use occurs in a labeling machine.

I claim:

1. A rotary turret for use in a rotary packaging machine, said turret having a plurality of pedestals located thereon, said turret being connected to a first power source, said first power source causing said turret to rotate, said pedestals being connected indirectly to second power sources to cause said pedestals to rotate, said pedestals being capable of rotating independently of said turret, said second power sources having a base that is mounted in a fixed position so that said base does not move with said turret as said turret rotates, said second power sources being individual power sources with one second power source for each pedestal so that said pedestals can be made to rotate independently of one another.

2. A rotary turret as claimed in claim 1 wherein each second power source is connected to rotate some of said pedestals in an opposite direction.

3. A rotary turret as claimed in claim 1 wherein there are a plurality of ring gears, there being one ring gear corresponding to each pedestal, each ring gear being connected to cause the corresponding pedestal to rotate when the ring gear rotates, each second power source being engagingly connected to one ring gear so that each second power source rotates one pedestal of said plurality of pedestals.

4. A rotary turret as claimed in claim 3 wherein the ring gears are concentrically mounted relative to one another.

5. A rotary turret as claimed in claim 4 wherein the ring gears are rotatably separated from one another by bearings.

6. A rotary turret as claimed in claim 5 wherein the individual second power sources are second electric motors, each second electric motor having a shaft, each shaft having a second gear fixably connected thereto, each second gear engaging a corresponding ring gear, each pedestal having a shaft extending therefrom, each shaft of each pedestal having a third gear fixably mounted thereon, each ring gear being engagedly connected to one corresponding third gear.

7. A rotary turret as claimed in claim 6 wherein the turret has a shaft extending therefrom, said shaft of said turret being connected to said first power source, said first power source being a first electric motor.

8. A rotary turret as claimed in claim 7 wherein the turret is a lower turret and there is also an upper turret mounted on said shaft of said lower turret the upper turret rotating in unison with the lower turret and having means to retain containers on the pedestals.

9. A method of controlling a plurality of pedestals on a rotary turret, said turret being connected to a first power source, said pedestals being connected indirectly to second power sources said second power sources being mounted in a fixed position so that said second power sources do not rotate with said, turrets aid method comprising concentrically mounting ring gears, said ring gears being rotatable relative to one another, connecting an individual second power source to a corresponding ring gear and connecting each ring gear to cause one pedestal to rotate.

* * * * *